US008419082B2

(12) United States Patent
Wu et al.

(10) Patent No.: US 8,419,082 B2
(45) Date of Patent: Apr. 16, 2013

(54) LATCHING MECHANISM AND COMPUTER CHASSIS USING THE SAME

(75) Inventors: Wei Wu, Shenzhen (CN); Xin Yang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 397 days.

(21) Appl. No.: 12/869,695

(22) Filed: Aug. 26, 2010

(65) Prior Publication Data

US 2011/0101835 A1 May 5, 2011

(30) Foreign Application Priority Data

Oct. 30, 2009 (CN) .......................... 2009 1 0309182

(51) Int. Cl.
*E05C 19/10* (2006.01)

(52) U.S. Cl.
USPC ....................... 292/116; 292/95; 292/DIG. 37

(58) Field of Classification Search .................. 292/116, 292/112, DIG. 37; 312/223.2
See application file for complete search history.

(56) References Cited

U.S. PATENT DOCUMENTS

| | | | | |
|---|---|---|---|---|
| 324,883 | A * | 8/1885 | Prindle | 292/51 |
| 6,256,194 | B1 * | 7/2001 | Choi et al. | 361/679.58 |
| 7,184,261 | B2 * | 2/2007 | Chung | 361/679.56 |
| 7,905,521 | B2 * | 3/2011 | Liang et al. | 292/51 |
| 2006/0133025 | A1 * | 6/2006 | Wu et al. | 361/683 |
| 2007/0001559 | A1 * | 1/2007 | Chen et al. | 312/223.2 |

* cited by examiner

*Primary Examiner* — Thomas Beach
*Assistant Examiner* — Faria Ahmad
(74) *Attorney, Agent, or Firm* — Altis Law Group, Inc.

(57) ABSTRACT

A computer chassis includes a housing, a sideboard defining a latching hole, and a latching mechanism. The latching mechanism includes a supporting assembly, a first latching member, a second latching member, a rotation shaft, an elastic member, and a pressing assembly. The supporting assembly is mounted in the housing. The first latching member includes a first gear portion and a first hook. The second latching member includes a second gear portion and a second hook. The rotation shaft passes through the second latching assembly and the first latching assembly and is partially received in the base. The gear is engaged with the first gear portion and the second gear portion. One end of the elastic member is secured to the first latching member, and an opposite end of the elastic member is secured to the second latching member. The pressing assembly is moveably connected to the rotation shaft.

16 Claims, 8 Drawing Sheets

LATCHING MECHANISM AND COMPUTER CHASSIS USING THE SAME

BACKGROUND

1. Technical Field

The present disclosure relates to latching mechanisms and computer chassis and, particularly, to a computer chassis using a latching mechanism to latch a sideboard of the computer chassis to a housing of the computer chassis.

2. Description of Related Art

A conventional computer chassis includes a housing defining an interior space to receive electronic elements and a sideboard detachably connected to the housing. Conventionally, the sideboard is detachably connected to the housing by screws, which is time-consuming in assembly.

BRIEF DESCRIPTION OF THE DRAWINGS

The components of the drawings are not necessarily drawn to scale, the emphasis instead being placed upon clearly illustrating the principles of a computer chassis. Moreover, in the drawings, like reference numerals designate corresponding parts throughout several views.

DETAILED DESCRIPTION

Figure 1:
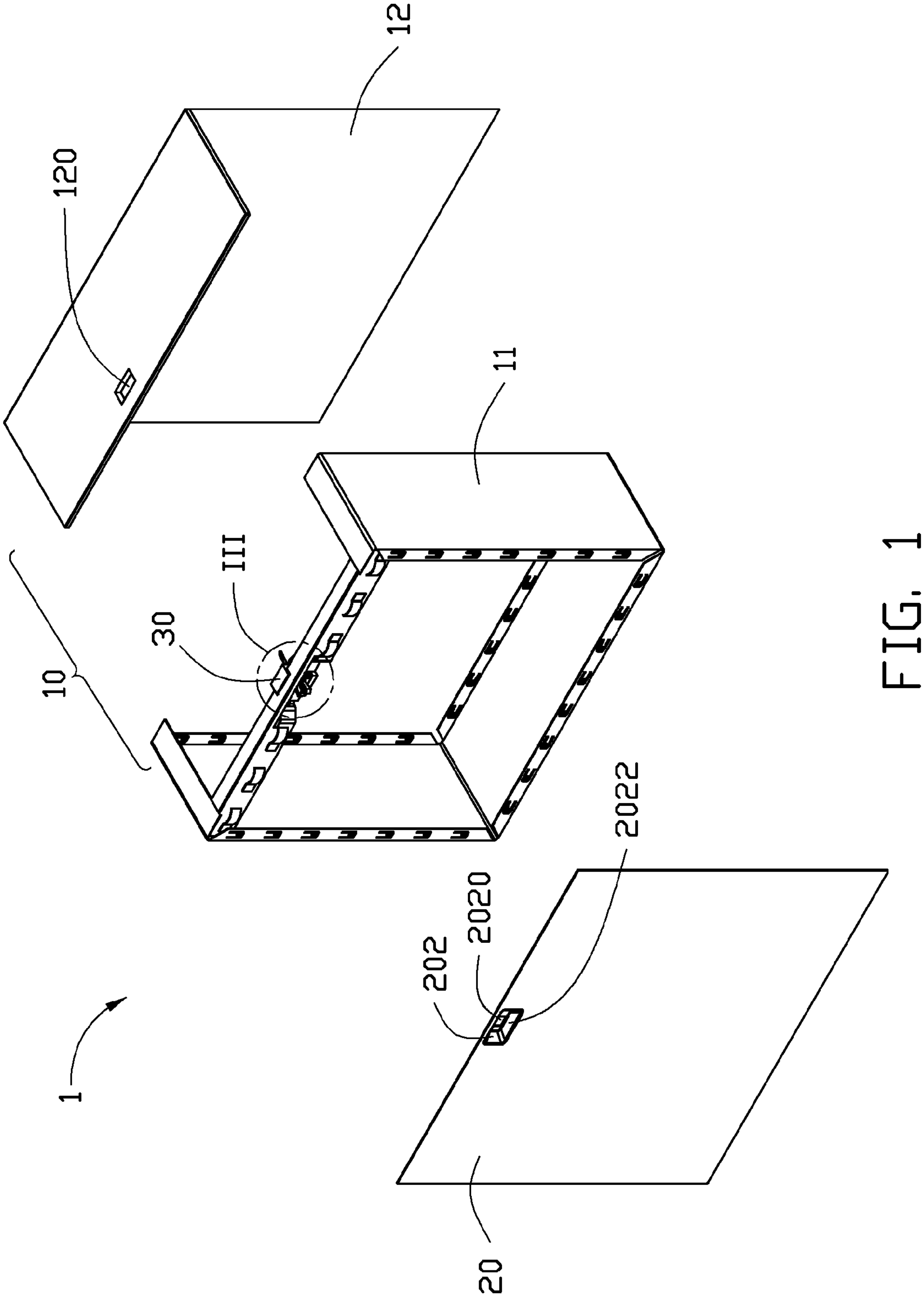
FIG. 1 is an exploded, perspective view of a computer chassis in accordance with an exemplary embodiment.

Referring to FIG. 1, a computer chassis 1 includes a housing 10, a sideboard 20, and a latching mechanism 30. The housing 10 includes an inner frame 11 and an outer frame 12 secured to the inner frame 11 to form an interior space to accommodate electronic elements (not shown). The outer frame 12 defines a top slot 120. The latching mechanism 30 is mounted on the inner frame 11 and is operable by the top slot 120. The sideboard 20 defines a latching hole 202. The latching mechanism 30 cooperates with the latching hole 202 to detachably latch the sideboard 20 to the housing 10. In this embodiment, the latching hole 202 includes a smaller opening 2020 facing the housing 10 and an opposite larger opening 2022. The latching mechanism 30 can pass through the smaller opening 2020 and be received in the latching hole 202. The latching mechanism 30 can further engage sidewalls of the latching hole 202 to latch the sideboard 20 to the housing 10.

Figure 2:
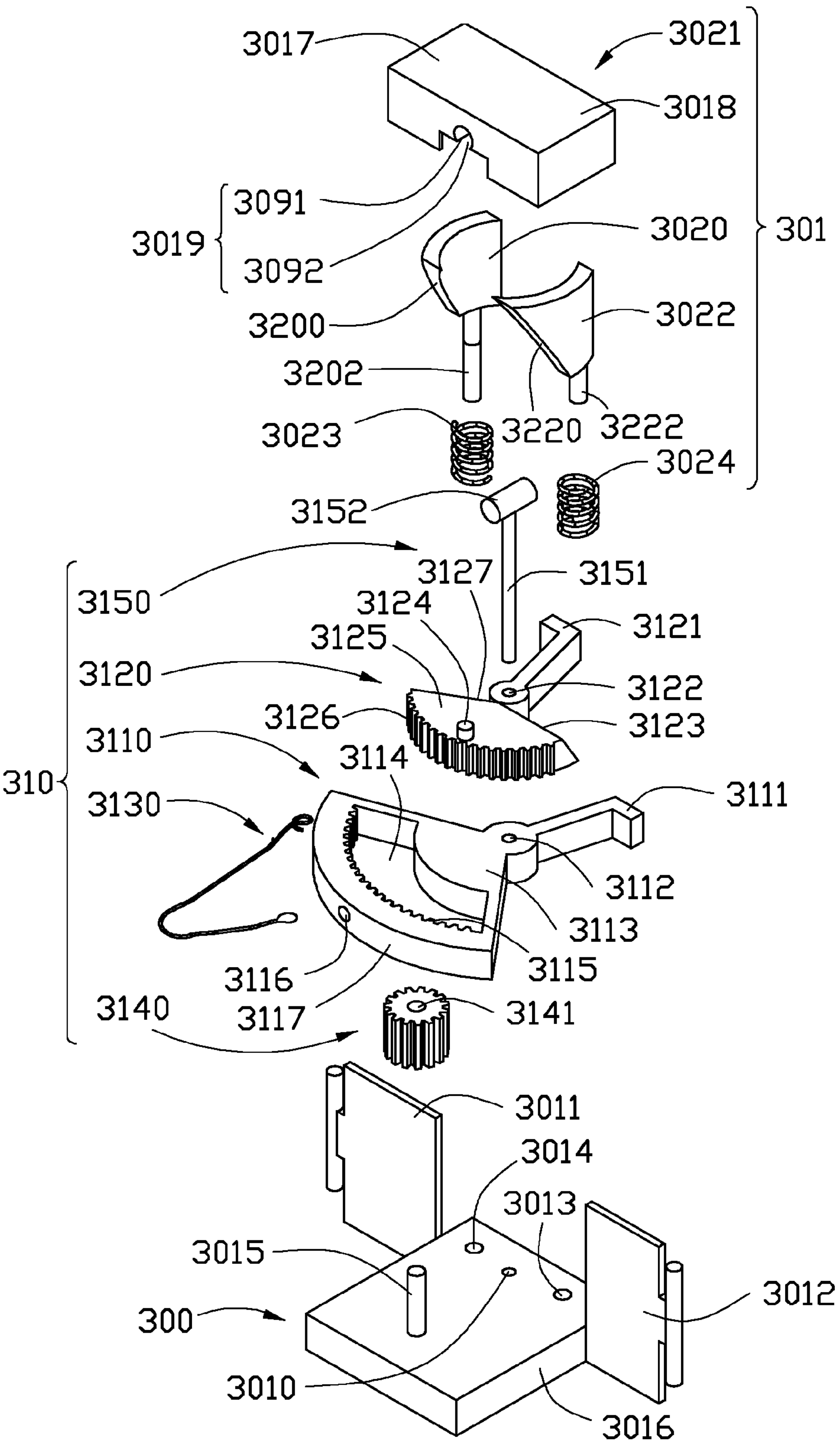
FIG. 2 is an exploded, perspective view of a latching mechanism of the computer chassis of FIG. 1.

Referring also to FIG. 2, the latching mechanism 30 includes a supporting assembly 300, a latching assembly 310, and a pressing assembly 301.

The supporting assembly 300 includes a base 3016. In this embodiment, the base 3016 is substantially square. A pair of fixing plates 3011 and 3012 is respectively secured to opposite sidewalls of the base 3016. The fixing plates 3011 and 3012 are secured to the inner frame 11 to secure the base 3016 to the inner frame 11. A pivot 3015 protrudes from the top of the base 3016. The base 3016 defines three positioning holes 3013, 3014, and 3010. The positioning hole 3010 is arranged between the positioning holes 3013 and 3014.

The latching assembly 310 includes a rotation shaft 3150, a first latching member 3110, a second latching member 3120, an elastic member 3130, and a gear 3140. In this embodiment, the elastic member 3130 may be a torsion spring.

The rotation shaft 3150 includes a first shaft 3151 and a second shaft 3152 perpendicular to the first shaft 3151.

The first latching member 3110 includes a first rotation portion 3113 and a first hook 3111 extending from one end of the first rotation portion 3113. In this embodiment, the first rotation portion 3113 is substantially sector-shaped. The first rotation portion 3113 defines a substantially sector-shaped through hole 3114. A sidewall of the through hole 3114 defines a first gear portion 3115 adjacent to a substantially sector-shaped sidewall 3117. The sidewall 3117 defines a receiving hole 3116 to receive one end of the elastic member 3130. The first latching member 3110 defines a through hole 3112 between the first rotation portion 3113 and the first hook 3111 to allow the first shaft 3151 to pass through.

The second latching member 3120 includes a second rotation portion 3125 and a second hook 3121 extending from one end of the second rotation portion 3125. In this embodiment, the second rotation portion 3125 is substantially sector-shaped, and the second rotation portion 3125 is smaller than the first rotation portion 3113. The second rotation portion 3125 includes a substantially sector-shaped second gear portion 3126. The second rotation portion 3125 includes two inclined surfaces 3123 and 3127. A projection 3124 protrudes from the top of the second rotation portion 3125 to fix another end of the elastic member 3130. The second latching member 3120 defines a through hole 3122 between the second rotation portion 3125 and the second hook 3121 to allow the first shaft 3151 to pass through.

In this embodiment, the first shaft 3151 passes through the through holes 3122, 3112 and is partially received in the positioning hole 3010, thus rotatably connecting the first latching member 3110 and the second latching member 3120 to the first shaft 3151. In this embodiment, the second latching member 3120 is arranged on the first latching member 3110.

The gear 3140 defines a shaft hole 3141. The pivot 3015 passes through the shaft hole 3141 to allow the gear 3140 to rotate about the pivot 3015. In this embodiment, the gear 3140 passes through the through hole 3114 to engage the first gear portion 3115 and the second gear portion 3126.

The pressing assembly 301 includes a pressing plate 3021, a first resisting member 3020, a second resisting member 3022, a pair of elastic members 3023 and 3024. In this embodiment, the elastic members 3023 and 3024 are coil springs.

The pressing plate 3021 includes two opposite ends 3017 and 3018. The pressing plate 3021 defines a slot 3019. The slot 3019 includes two brinks 3091 and an opening 3092. The opening 3092 is formed in a sidewall of the pressing plate 3021. The distance between the brinks 3091 is slightly less than the diameter of the second shaft 3152 and substantially equal to the diameter of the first shaft 3151. The second shaft 3152 is slid into the slot 3019 from the opening 3092. The brinks 3091 limit the second shaft 3152 from moving out of the slot 3019.

The first resisting member 3020 includes an inclined surface 3200. The inclined surface 3200 is inclined opposite to the inclined surface 3127, so they can match up and resist each other. The first resisting member 3020 further includes a rod 3202. The elastic member 3023 is arranged around the rod 3202. The rod 3202 is partially received in the positioning hole 3014. The second resisting member 3022 includes an inclined surface 3220. The inclined surface 3220 is inclined opposite to the inclined surface 3123, so they can match up and resist each other. The second resisting member 3022 further includes a rod 3222. The elastic member 3024 is arranged over the rod 3222. The rod 3222 is partially received in the positioning hole 3013.

Figure 3:
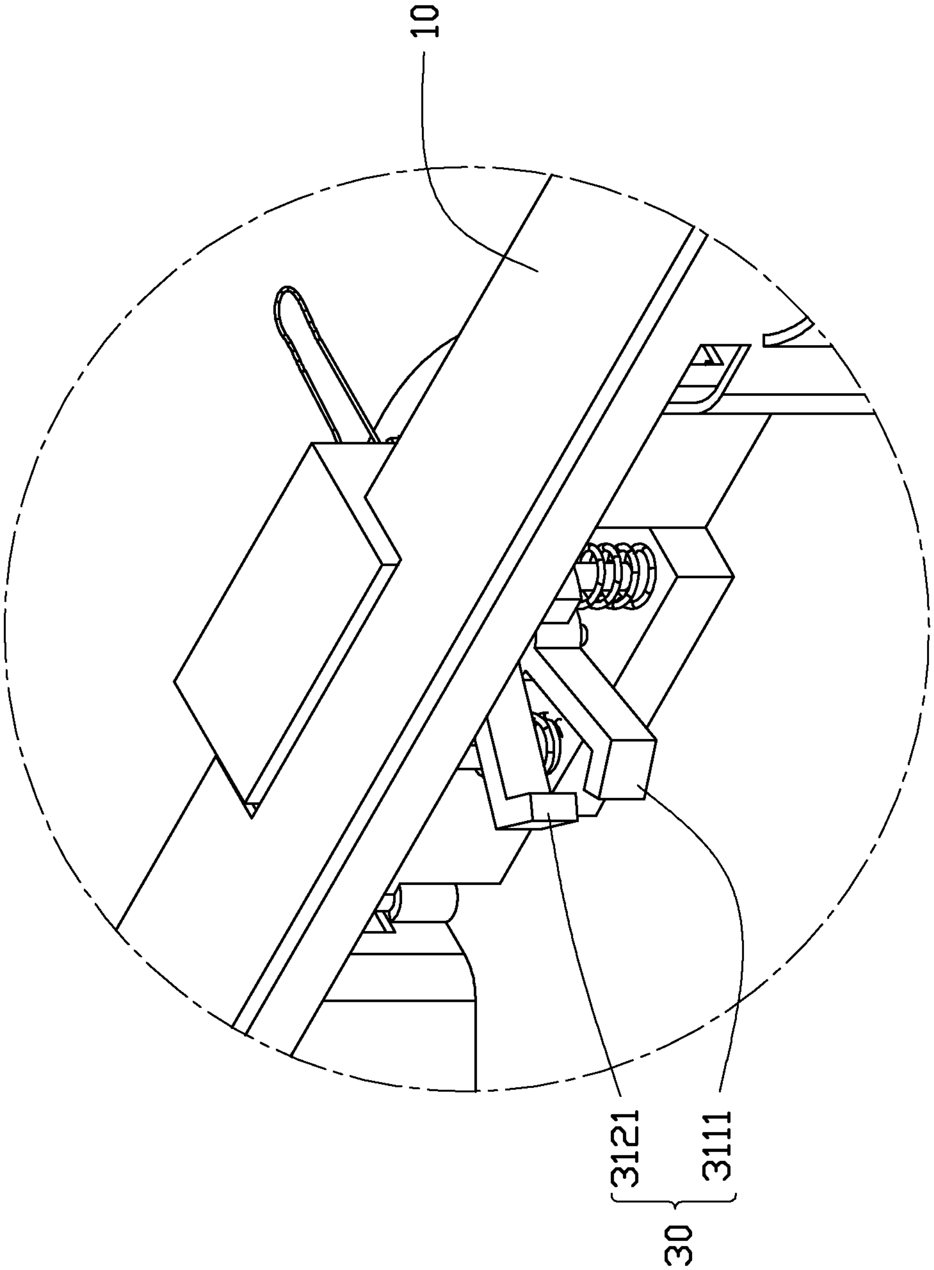
FIG. 3 is an isometric view taken along circle III of FIG. 1, showing the latching mechanism in a first state.
Figure 4:
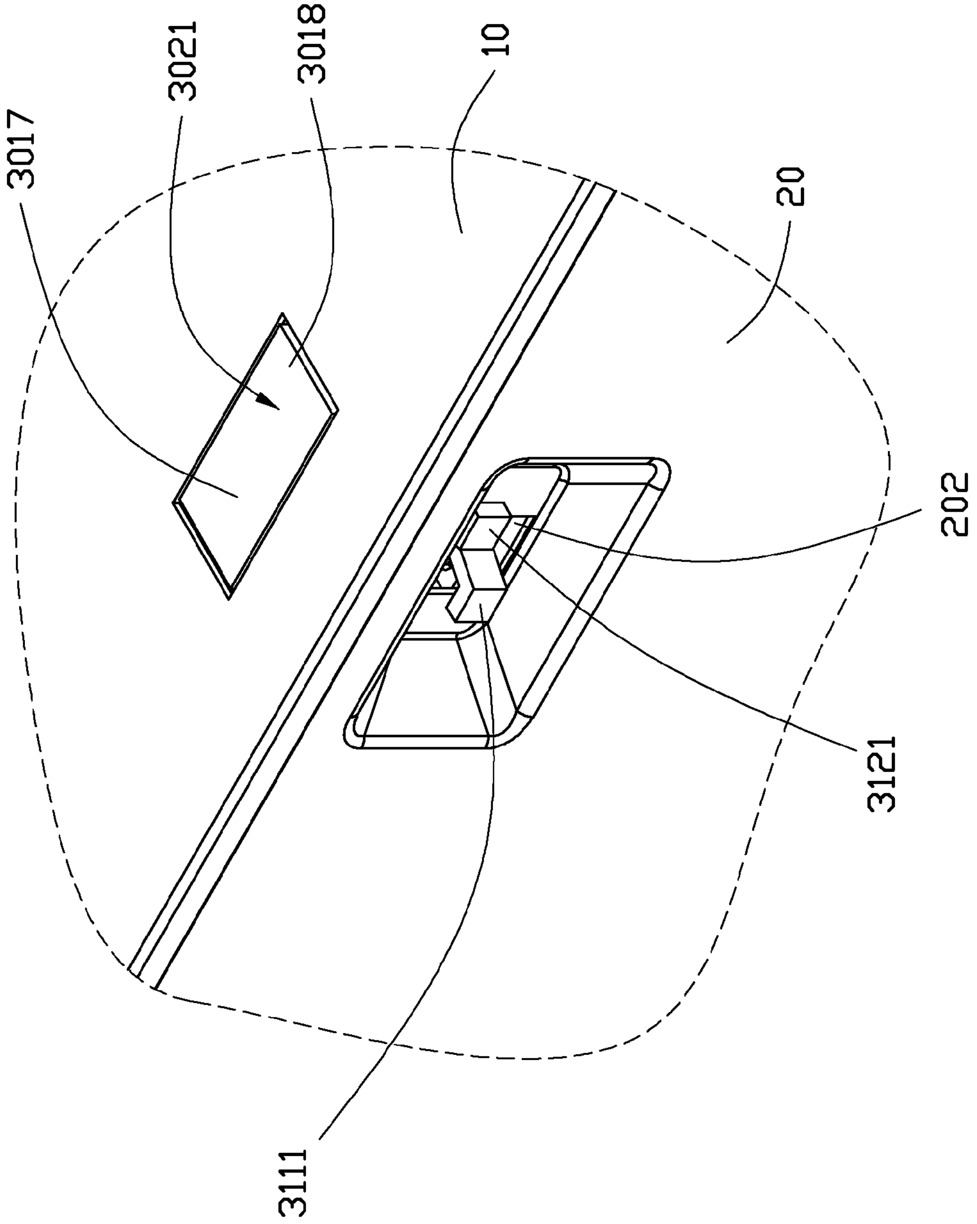
FIG. 4 is a partial, isometric view of the computer chassis of FIG. 1, showing the latching mechanism in a second state to latch a sideboard of the computer chassis to a housing of the computer chassis.

Referring to FIGS. 3-4, after assembling the latching mechanism 30, the first hook 3111 faces the second hook 3121. When the first hook 3111 faces the second hook 3121, the first hook 3111 and the second hook 3121 can pass through the smaller opening 2020 and be received in the latching hole 202. After the first hook 3111 and the second hook 3121 are received in the latching hole 202, pressure applied on the end 3018 of the pressing plate 3021 and the spring force of the elastic member 3130 cooperatively cause the first hook 3111 and the second hook 3121 to move away from each other until the first hook 3111 and the second hook 3121 respectively engage the sidewalls of the latching hole 202. At this point, the sideboard 20 is latched to the housing 10. Pressure applied on the end 3017 and the spring force of the elastic member 3130 cooperatively cause the first hook 3111 and the second hook 3121 to move toward each other until the first hook 3111 and the second hook 3121 respectively disengage from the sidewall of the latching hole 202. At this point, the sideboard 20 can be removed from the housing 10.

Figure 5:
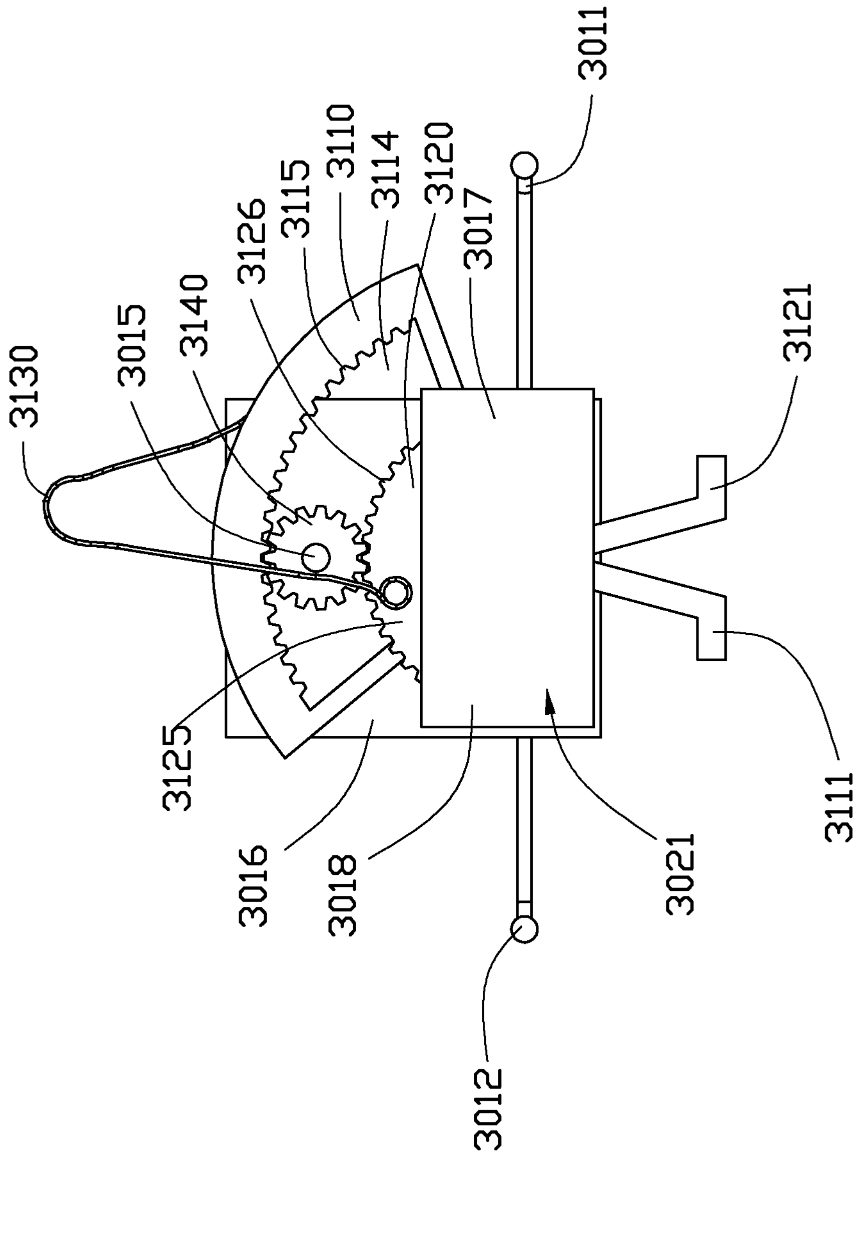
FIG. 5 is a plan view of the latching mechanism of FIG. 4, showing the latching mechanism in the second state.
Figure 6:
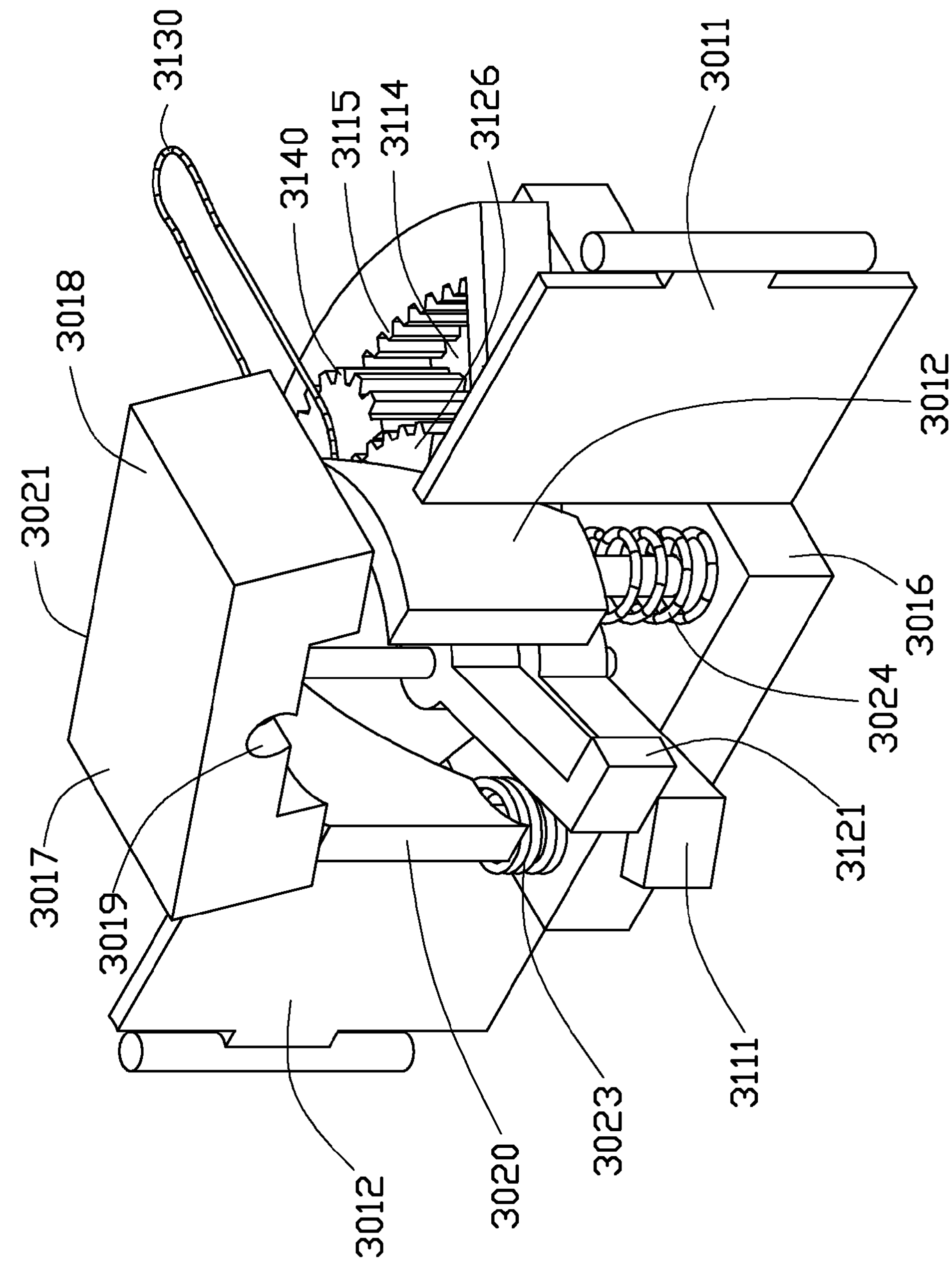
FIG. 6 is an isometric view of the latching mechanism of FIG. 1, showing the latching mechanism in a third state.
Figure 7:
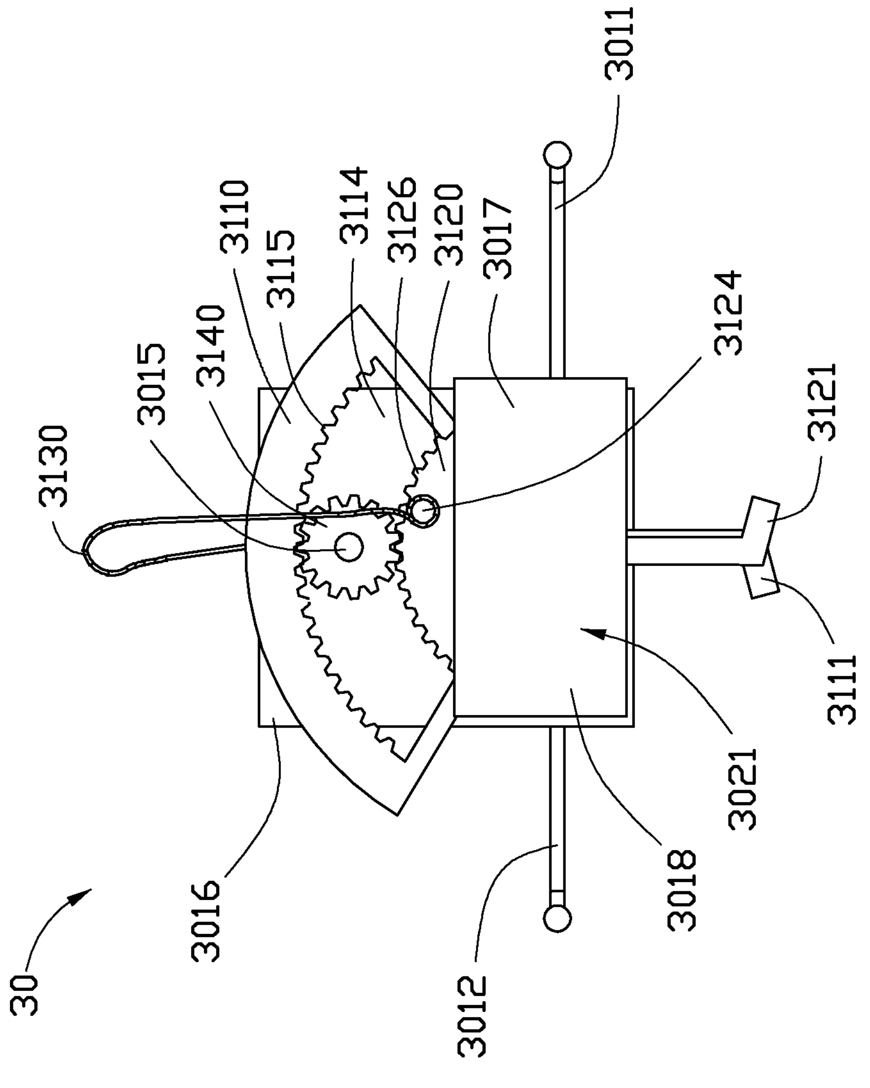
FIG. 7 is a top plan view of the latching mechanism of FIG. 6.
Figure 8:
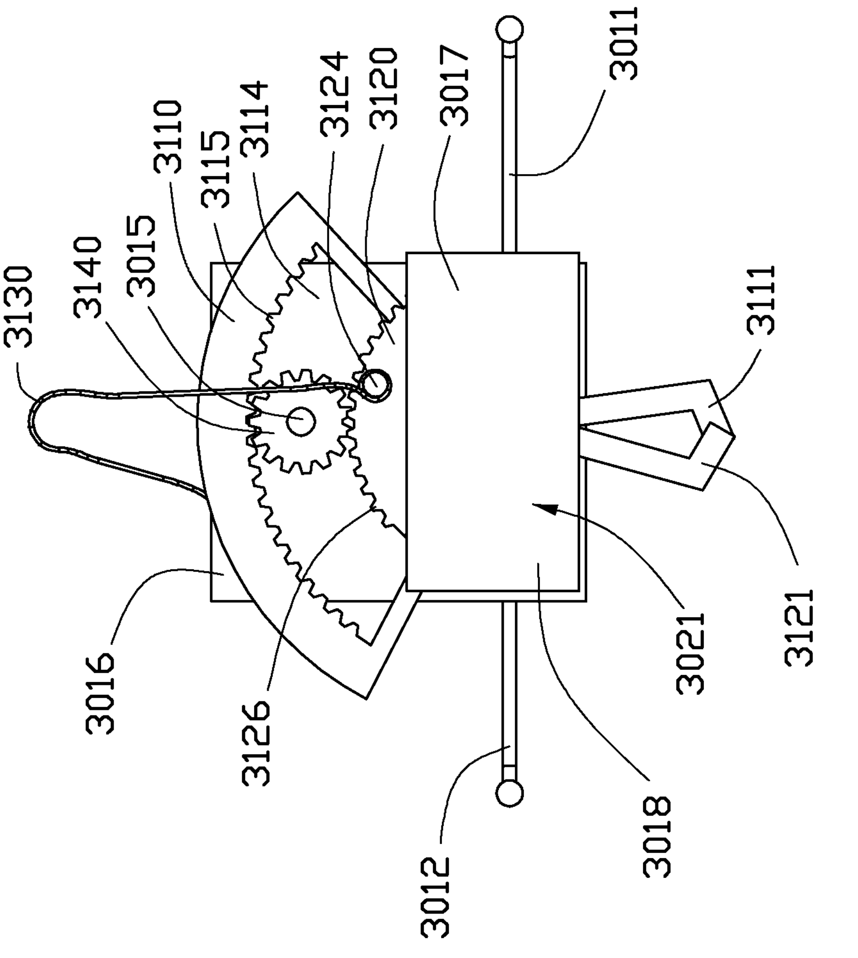
FIG. 8 is a plan view of the latching mechanism of FIG. 3, showing the latching mechanism in the first state.

FIGS. 5-8 show how to remove the sideboard 20 from the housing 10. FIG. 5 shows the first hook 3111 and the second hook 3121 are opposite to each other and are in a position to engage the sidewalls of the latching hole 202. To remove the sideboard 20 from the housing 10, the end 3017 is depressed to press the first resisting member 3020. Pressure applied on the first resisting member 3020 compresses the elastic member 3023 and causes the inclined surface 3200 to push the inclined surface 3127, thus the second latching member 3120 is pushed to rotate about the first shaft 3151 toward a first direction. While the second latching member 3120 rotates toward the first direction, the gear 3140 rotates to cause the first latching member 3110 to rotate about the first shaft 3151 towards a second direction opposite to the first direction. While the second latching member 3120 rotates toward the first direction and the first latching member 3110 rotates toward the second direction, the second hook 3121 and the first hook 3111 moves toward each other. While the elastic member 3023 may be fully compressed, the end 3017 may not be pressed downward. At this point, the end 3017 is released and the elastic member 3023 decompresses causing the first resisting member 3020 to return to its original state. The spring force of the elastic member 3130 causes the second latching member 3120 to further rotate toward the first direction, and causes the first latching member 3110 to further rotate toward the second direction until the second hook 3121 and the first hook 3111 move together. At this point, the first hook 3111 and the second hook 3121 disengage from the sidewalls of the latching hole 202, and the sideboard 20 can be removed from the housing 10.

To secure the sideboard 20 to the housing 10, the first hook 3111 and the second hook 3121 passes through the smaller opening 2020 and is received in the latching hole 202. The end 3018 is depressed to press the second resisting member 3022. Pressure on the second resisting member 3022 compresses the elastic member 3024 and causes the inclined surface 3220 to push the inclined surface 3123, thus the second latching member 3120 is pushed to rotate toward the second direction. While the second latching member 3120 rotates toward the second direction, the gear 3140 rotates to cause the first latching member 3110 to rotate towards the first direction. While the second latching member 3120 rotates toward the second direction and the first latching member 3110 rotates toward the first direction, the second hook 3121 and the first hook 3111 moves apart from each other. While the elastic member 3024 may be fully compressed, the end 3018 may not be pressed downward. At this point, the end 3018 is released, and the elastic member 3024 depresses causing the second resisting member 3022 to return to its original state. The spring force of the elastic member 3130 causes the second latching member 3120 to further rotate towards the second direction, and causes the first latching member 3110 to further rotate towards the first direction until the first hook 3111 and the second hook 3121 are opposite to each other. At this point, the first hook 3111 and the second 3121 engage the sidewalls of the latching hole 202, and the sideboard 20 is secured to the housing 10.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A computer chassis, comprising:

a housing;

a sideboard defining a latching hole, the latching hole comprising sidewalls; and a latching mechanism mounted in the housing and cooperating with the latching hole to detachably latch the sideboard to the housing, the latching mechanism comprising:

a supporting assembly secured to the housing and comprising a base, the base defining a first positioning hole;

a first latching member comprising a sector-shape through hole, a first gear portion, and a first hook, the first gear portion being formed in a sidewall of the sector-shape through hole, the first latching member further defining a first through hole arranged between the first gear portion and the first hook;

a second latching member comprising a second gear portion and a second hook, the second gear portion being sector-shaped, the second latching member further defining a second through hole arranged between the second gear portion and the second hook;

a rotation shaft passing through the second through hole and the first through hole and partially received in the first positioning hole;

a gear received in the sector-shape through hole to engaged with the first gear portion and the second gear portion;

a first elastic member, one end of the first elastic member being secured to the first latching member, and an opposite end of the first elastic member being secured to the second latching member; and a pressing assembly moveably connected to the rotation shaft;

wherein, when pressure is applied on the pressing assembly, the spring force of the first elastic member causes the first latching member and the second latching member to rotate in opposite directions until the first hook and the second hook are opposite to each other to engage sidewalls of the latching hole, or until the first hook and the second hook face each other to disengage from the sidewalls of the latching hole.

2. The computer chassis as described in claim 1, wherein a pivot protrudes from the base, the gear defines a shaft hole, the pivot passes through the shaft hole to rotatably connect the gear to the pivot.

3. The computer chassis as described in claim 1, wherein the first latching member defines a receiving hole to receive one end of the first elastic member, and a projection protrudes from the second latching member to secure an opposite end of the first elastic member.

4. The computer chassis as described in claim 1, wherein the pressing assembly comprises a pressing plate defining a slot, the rotation shaft comprises a first shaft and a second shaft perpendicular to the first shaft, the first shaft passes through the second through hole and the first through hole, and the second shaft is received in the slot.

5. The computer chassis as described in claim 4, wherein the pressing assembly further comprises a first resisting member, a second resisting member, a second elastic member, and a third elastic member, the first resisting member comprises a first rod, and the second resisting member comprises a second rod, the second elastic member is arranged over the first rod, and the third elastic member is arranged over the second rod, the base defines a second positioning hole and a third positioning hole, the first rod is partially received in the second positioning hole, and the second rod is partially received in the third positioning hole, the first resisting member and the second resisting member are arranged at two opposite sides of the rotation shaft.

6. The computer chassis as described in claim 5, wherein the first resisting member further comprises a first inclined surface, the second resisting member further comprises a second inclined surface, the second latching member comprises a third inclined surface and a fourth inclined surface, the first inclined surface is able to resist the third inclined surface to cause the second latching member to rotate, and the second inclined surface is able to resist the fourth inclined surface to cause the first latching member to rotate.

7. The computer chassis as described in claim 6, wherein the pressing plate comprises a first end and a second end, the first resisting member is below the first end, and the second resisting member is below the second end.

8. The computer chassis as described in claim 7, wherein when the first end is depressed to press the first resisting member, the second elastic member is compressed, and the first inclined surface pushes the third inclined surface to cause the second latching member to rotate toward a first direction, the rotation of the second latching member causes the gear to rotate, and the rotation of the gear causes the first latching member to rotate towards a second direction opposite to the first direction, the rotation of the first latching member and the second latching member causes the first hook and the second hook to move towards each other, when the first end is released, the spring force of the first elastic member causes the second latching member to further rotate toward the first direction and causes the first latching member to further rotate toward the second direction until the first hook and the second hook disengage from the sidewalls of the latching hole.

9. The computer chassis as described in claim 8, wherein when the second end is depressed to press the second resisting member, the third elastic member is compressed, and the second inclined surface pushes the fourth inclined surface to cause the second latching member to rotate toward the second direction, the rotation of the second latching member causes the gear to rotate, and the rotation of the gear causes the first latching member to rotate toward the first direction, the rotation of the first latching member and the second latching member causes the first hook and the second hook to move apart from each other, when the second end is released, the spring force of the first elastic member causes the second latching member to further rotate toward the second direction and causes the first latching member to further rotate toward the first direction until the first hook and the second hook engage the sidewalls of the latching hole.

10. A latching mechanism applied in a computer chassis, the computer chassis comprising a housing and a sideboard, the latching mechanism mounted in the housing, the sideboard defining a latching hole, the latching hole comprising sidewalls, the latching mechanism comprising:

a supporting assembly secured to the housing and comprising a base, the base defining a first positioning hole;

a first latching member comprising a sector-shape through hole, a first gear portion, and a first hook, the first gear portion being formed in a sidewall of the sector-shape through hole, the first latching member further defining a first through hole arranged between the first gear portion and the first hook;

a second latching member comprising a second gear portion and a second hook, the second gear portion being sector-shaped, the second latching member further defining a second through hole arranged between the second gear portion and the second hook;

a rotation shaft passing through the second through hole and the first through hole and partially received in the first positioning hole;

a gear received in the sector-shape through hole to engaged with the first gear portion and the second gear portion;

a first elastic member, one end of the first elastic member being secured to the first latching member, and an opposite end of the first elastic member being secured to the second latching member; and a pressing assembly moveably connected to the rotation shaft;

wherein, when pressure is applied on the pressing assembly, the spring force of the first elastic member causes the first latching member and the second latching member to rotate in opposite directions until the first hook and the second hook are opposite to each other to engage sidewalls of the latching hole, or until the first hook and the second hook face each other to disengage from the sidewalls of the latching hole.

11. The latching mechanism as described in claim 10, wherein a pivot protrudes from the base, the gear defines a shaft hole, the pivot passes through the shaft hole to rotatably connect the gear to the pivot.

12. The latching mechanism as described in claim 10, wherein the first latching member defines a receiving hole to receive one end of the first elastic member, and a projection protrudes from the second latching member to secure an opposite end of the first elastic member.

13. The latching mechanism as described in claim 10, wherein the pressing assembly comprises a pressing plate defining a slot, the rotation shaft comprises a first shaft and a second shaft perpendicular to the first shaft, the first shaft passes through the second through hole and the first through hole, and the second shaft is received in the slot.

14. The latching mechanism as described in claim 13, wherein the pressing assembly further comprises a first resisting member, a second resisting member, a second elastic member, and a third elastic member, the first resisting member comprises a first rod, and the second resisting member comprises a second rod, the second elastic member is arranged over the first rod, and the third elastic member is arranged over the second rod, the base defines a second positioning hole and a third positioning hole, the first rod is partially received in the second positioning hole, and the second rod is partially received in the third positioning hole, the first resisting member and the second resisting member are arranged at two opposite sides of the rotation shaft.

15. The latching mechanism as described in claim 14, wherein the first resisting member further comprises a first inclined surface, the second resisting member further comprises a second inclined surface, the second latching member comprises a third inclined surface and a fourth inclined surface, the first inclined surface is able to resist the third inclined surface to cause the second latching member to rotate, and the second inclined surface is able to resist the fourth inclined surface to cause the first latching member to rotate.

16. The latching mechanism as described in claim 15, wherein the pressing plate comprises a first end and a second end, the first resisting member is below the first end, and the second resisting member is below the second end.

* * * * *